United States Patent
Marchiori et al.

(10) Patent No.: US 11,188,136 B2
(45) Date of Patent: Nov. 30, 2021

(54) MANAGING CONTENT BASED ON BATTERY USAGE IN DISPLAYING THE CONTENT ON DEVICES

(71) Applicant: Google LLC, Mountain View, CA (US)

(72) Inventors: Eugenio Jorge Marchiori, London (GB); Abhijit Chandgadkar, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 249 days.

(21) Appl. No.: 16/343,283

(22) PCT Filed: Dec. 12, 2017

(86) PCT No.: PCT/US2017/065840
§ 371 (c)(1),
(2) Date: Apr. 18, 2019

(87) PCT Pub. No.: WO2018/144136
PCT Pub. Date: Aug. 9, 2018

(65) Prior Publication Data
US 2019/0258305 A1    Aug. 22, 2019

Related U.S. Application Data

(63) Continuation of application No. PCT/US2017/016744, filed on Feb. 6, 2017.

(51) Int. Cl.
*G06F 1/32* (2019.01)
*G06F 1/3212* (2019.01)
(Continued)

(52) U.S. Cl.
CPC .............. *G06F 1/3212* (2013.01); *G06F 1/28* (2013.01); *G06F 1/3209* (2013.01);
(Continued)

(58) Field of Classification Search
CPC ....... G06F 1/3212; G06F 16/1737; G06F 1/28
(Continued)

(56) References Cited

U.S. PATENT DOCUMENTS 7,407,108 B1    8/2008 Euler et al.
9,049,582 B1 *  6/2015 Hassan ............. H04W 52/0261
(Continued)

OTHER PUBLICATIONS

International Preliminary Report on Patentability on PCT/US2017/065840 dated Aug. 15, 2019 (9 pages).
(Continued)

*Primary Examiner* — Robert A Cassity
(74) *Attorney, Agent, or Firm* — Marshall, Gerstein & Borun LLP

(57) ABSTRACT

Systems and methods for managing content to improve battery life of client devices. A data processing system receives requests for content items from client devices. The data processing system selects the content items from a set of content items and transmits the content items to the respective client devices. The client devices acquire battery status information related to the displaying or rendering of their respective content item. The data processing system receives the battery status information from the client devices and determines a power consumption value associated with the content items. Based on the power consumption value being greater than a threshold power consumption value, the data processing system modifies a policy for selecting the content items from the set of content items.

19 Claims, 8 Drawing Sheets

(51) Int. Cl.
  *G06F 1/3209*  (2019.01)
  *H04M 1/73*  (2006.01)
  *G06F 16/17*  (2019.01)
  *G06F 1/28*  (2006.01)

(52) U.S. Cl.
  CPC .......... *G06F 16/1737* (2019.01); *H04M 1/73* (2013.01); *Y02D 10/00* (2018.01)

(58) Field of Classification Search
  USPC ........................................................ 713/320
  See application file for complete search history.

(56) References Cited

U.S. PATENT DOCUMENTS

| | | | | |
|---|---|---|---|---|
| 9,829,947 | B1* | 11/2017 | Nagarajan | G06F 1/3212 |
| 10,423,514 | B1* | 9/2019 | Padidar | G06F 11/3062 |
| 2011/0301890 | A1* | 12/2011 | Shirriff | G01R 31/392 |
| | | | | 702/63 |
| 2012/0131145 | A1 | 5/2012 | Garg | |
| 2013/0061079 | A1 | 3/2013 | Kataoka | |
| 2014/0136727 | A1 | 5/2014 | Lim et al. | |
| 2015/0227445 | A1* | 8/2015 | Arscott | G06F 11/3062 |
| | | | | 713/340 |
| 2016/0021208 | A1* | 1/2016 | Freiman | G06F 1/3265 |
| | | | | 709/203 |
| 2016/0370846 | A9 | 12/2016 | Virolainen et al. | |
| 2020/0410049 | A1* | 12/2020 | Tripathi | G06F 40/186 |

OTHER PUBLICATIONS

International Search Report and Written Opinion for PCT/US2017/016744 dated Oct. 6, 2017 (12 pages).
International Search Report and Written Opinion for PCT/US2017/065840 dated Mar. 26, 2018 (14 pages).
R.J.G. Simons and A. Pras "The Hidden Energy Cost of Web Advertising" 8 pages, Faculty of Electrical Engineering, Mathematics and Computer Science University of Twente, Enschede, The Netherlands (8 pages).
Thompson, Chris, et al. "Analyzing Mobile Application Software Power Consumption Via Model-Driven Engineering" 27 pages, Vanderbilt University, Nashville, TN, USA (27 pages).
Examination Report for EP Appln. Ser. No. 17822949.8 dated Apr. 9, 2020 (8 pages).
International Preliminary Report on Patentability on Appln. Ser. No. PCT/US2017/016744 dated Aug. 15, 2019 (11 pages).
Notice of Allowance for U.S. Appl. No. 16/349,942 dated Mar. 26, 2021 (6 pages).
First Office Action for CN Appln. Ser. No. 201780002013.4 dated Nov. 10, 2020 (38 pages).
Non-Final Office Action for U.S. Appl. No. 16/349,942 dated Dec. 22, 2020 (29 pages).

* cited by examiner

600

| Content ID | Battery Usage Estimate |
|---|---|
| 1234 | -0.25 |
| 9876 | -0.5 |
| 5738 | -0.2 |
| 3456 | -0.05 |
| . | . |
| . | . |
| . | . |
| 9876 | -0.3 |

Figure 6

MANAGING CONTENT BASED ON BATTERY USAGE IN DISPLAYING THE CONTENT ON DEVICES

RELATED APPLICATIONS

The present application claims the benefit of and priority to P.C.T. Application No. PCT/US2017/016744, entitled "Managing Content Based on Battery Usage in Displaying the Content on Devices," filed Feb. 6, 2017, the entirety of which is incorporated by reference herein.

BACKGROUND

In a computer networked environment such as the interne, data from a server can be delivered to a client device responsive to a request for content. The client device receives the data from the server. The data can include instructions for rendering content corresponding to the data for display at the client device. The client device can consume power while the client device renders and displays the content.

SUMMARY

At least one aspect is directed to a method for improving the battery life of a mobile device. The method includes receiving a plurality of battery change indications, each battery change indication indicating variation of battery level of a respective mobile device of a plurality of mobile devices while a respective content item of a plurality of content items is displayed on the mobile device. The method further includes receiving mobile device property data, the mobile device property data indicating one or more mobile device properties with respective mobile devices of the plurality of mobile devices. The method also includes determining relationships between variation of battery level and content items of the plurality of content items based upon the plurality of battery change indications and the mobile device property data. The method additionally includes modifying the plurality of content items based upon the determined relationships to generate a modified plurality of content items.

In some embodiments, the method also includes providing content items of the modified plurality of content items to one or more mobile devices for display.

In some implementations, the generated modified plurality of content items is associated with a mobile device property, and where content items of the modified plurality of content items are provided to mobile devices based upon the associated mobile device property and properties associated with the mobile devices.

In some implementations, content items of the plurality of content items have associated content item properties, and where determining relationships between variation of battery level and content items of the plurality of content items includes determining relationships between variation of battery level and content item properties.

In some implementations, modifying the plurality of content items includes selecting a content item property based upon the determined relationships between variation of battery level and content item properties, selecting content items having an associated property corresponding to the content item property, and modifying the selected content items.

In some implementations, determining relationships between variation of battery level and content items of the plurality of content items based upon the plurality of battery change indications and the mobile device property data includes processing the plurality of battery change indications and the mobile device property data using a regression model.

In some implementations, each battery change indication is obtained by transmitting a content item to a mobile device, the content item including content to be displayed at the device and a script, where the script is arranged to cause a battery level of the mobile device to be measured at a first time and at a second subsequent time and to transmit data indicative of variation of the battery level between the first and second time to a server.

In some implementations, the script is embedded in the content item.

In some implementations, the one or more mobile device properties include a property of the mobile device selected from the group consisting of: a web page displayed with the content item; a data communication protocol; and a screen brightness.

At least one aspect is directed to a method for managing content to improve battery life of a mobile device. The method includes receiving, by a data processing system including one or more servers, a plurality of content requests from a plurality of mobile devices. The method further includes transmitting, by the data processing system, responsive to each content request of the plurality of content requests, a respective content item selected from a set of content items to the respective mobile device from which the content request was received. The method also includes receiving, by the data processing system, from each of the plurality of mobile devices to which the respective content item was transmitted, battery status information of a battery powering the respective mobile device. The method additionally includes determining, by the data processing system, for each content item transmitted to a respective mobile device using the battery status information received from the respective mobile device to which the content item was transmitted, an amount of power the mobile device consumed to present the content item. The method further includes determining, by the data processing system, for each content item, a battery usage value corresponding to the determined amounts of power mobile devices consumed to present the content item. The method also includes modifying, by the data processing system, based on the respective battery usage values of the content items of the set of content items, a content selection policy for selecting content items from the set of content items to transmit to mobile devices responsive to receiving content requests.

At least one aspect is directed to a system including a processor and a memory coupled to the processor. The memory stores computer-executable instructions, which when executed by the processor, cause the processor to receive a plurality of content requests from a plurality of mobile devices. The computer-executable instructions, which when executed by the processor, further cause the processor to transmit, responsive to each content request of the plurality of content requests, a respective content item selected from a set of content items to the respective mobile device from which the content request was received. The computer-executable instructions, which when executed by the processor, also cause the processor to receive from each of the plurality of mobile devices to which the respective content item was transmitted, battery status information of a battery powering the respective mobile device. The computer-executable instructions, which when executed by the processor, additionally cause the processor to determine for each content item transmitted to a respective mobile device using the battery status information received from the respective mobile device to which the content item was transmitted, an amount of power the mobile device consumed to present the content item. The computer-executable instructions, which when executed by the processor, further cause the processor to determine, for each content item, a battery usage value corresponding to the determined amounts of power mobile devices consumed to present the content item. The computer-executable instructions, which when executed by the processor, also cause the processor to modify, based on the respective battery usage values of the content items of the set of content items, a content selection policy for selecting content items from the set of content items to transmit to mobile devices responsive to receiving content requests.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 depicts a representation of battery usage estimate data according to some implementations.

DETAILED DESCRIPTION

Following below are more detailed descriptions of various concepts related to, and implementations of, methods, apparatuses, and systems of improving battery life of a mobile device. Mobile devices can include, among others, desktop computers, laptop computers, tablet computers, smartphones, personal digital assistants, consumer computing devices, servers, clients, digital video recorders, a set-top box for a television, a video game console, digital personal assistants, or any other computing or portable device. The various concepts introduced above and discussed in greater detail below may be implemented in any of numerous ways, as the described concepts are not limited to any particular manner of implementation.

The present disclosure relates to systems and methods for determining a relationship between a content item and the amount of power consumed in displaying the content item on a mobile device. Further, the disclosure relates to using the relationship to inform a policy for generation and selection of content items delivered to the mobile device. The policy can be used to improve the battery life of mobile devices by restricting selection of certain content items based on the determined relationship of the content item and the amount of power consumed in displaying the content item on a mobile device.

Content displayed on a computing device, such as a mobile device, can include text and other content items, such as images or video. An application executing on the mobile device can request these content items from a server and display them on the mobile device. The displaying of the content items on the mobile device consumes power, which can be provided by a battery on the mobile device. Moreover, the amount of power consumed for displaying a content item can depend upon the nature of the content item. For example, displaying a video content item may consume more power than displaying an image content item. In some cases, displaying high power consuming content items may undesirably drain the battery.

Figure 1:
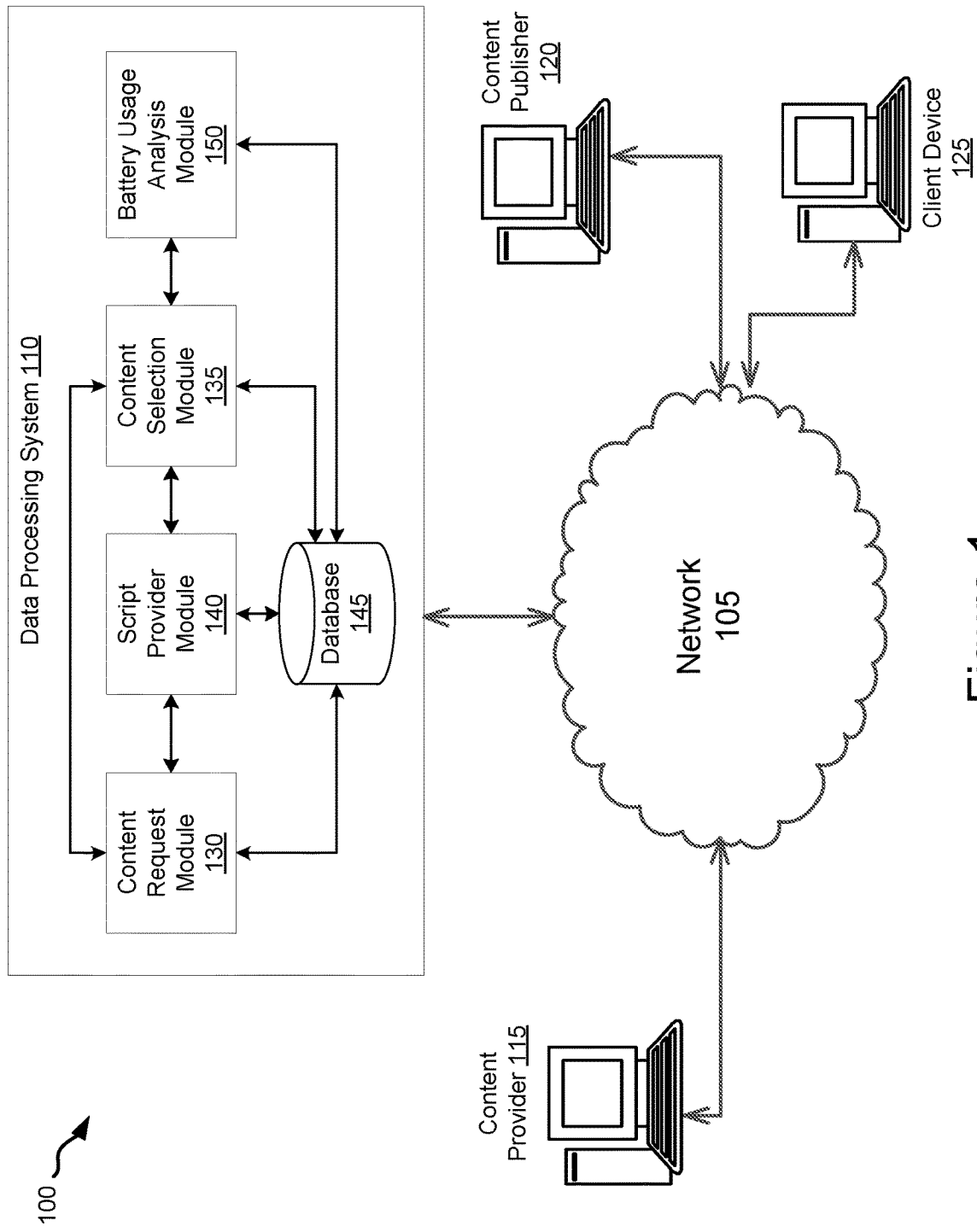
FIG. 1 shows a block diagram depicting an environment for managing content delivered to mobile devices according to some implementations.

FIG. 1 shows a block diagram depicting an environment for managing content delivered to mobile devices to preserve or improve the battery life of mobile devices. The environment 100 includes at least one data processing system 110, a network 105, at least one content provider computing device 115, at least one content publisher computing device 120, and at least one client computing device 125. The data processing system 110 can include at least one processor (or a processing circuit) and a memory. The memory stores processor-executable instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language. The data processing system 110 can include one or more computing devices or servers that can perform various functions.

The network 105 can include computer networks such as the interne, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client computing device 125. The network 105 may be any form of computer network that relays information between the client computing device 125, data processing system 110, and one or more content sources, for example, web servers, content servers, amongst others. For example, the network 105 may include the Internet and/or other types of data networks, such as a local area network (LAN), a wide area network (WAN), a cellular network, satellite network, or other types of data networks. The network 105 can also include any number of computing devices (e.g., computer, servers, routers, network switches, etc.) that are configured to receive and/or transmit data within network 105. The network 105 can further include any number of hardwired and/or wireless connections. For example, the client computing device 125 can communicate wirelessly (e.g., via WiFi, cellular, radio, etc.) with a transceiver that is hardwired (e.g., via a fiber optic cable, a CAT5 cable, etc.) to other computing devices in network 105.

The content provider computing device 115 can include servers or other computing devices operated by a content provider entity to provide one or more content items for display on information resources at the client computing device 125. The content provided by the content provider computing device 115 can include third-party content items for display on information resources, such as a website or web page that includes primary content, e.g., content provided by the content publisher computing device 120. The content items can also be displayed on a search results web page. For instance, the content provider computing device 115 can provide or be the source of one or more content items for display in content slots of content web pages, such as a web page of a company where the primary content of the web page is provided by the content publisher computing device, or for display on a search results landing page provided by a search engine. The content items associated with the content provider computing device 115 can be displayed on information resources other than web pages, such as content displayed as part of the execution of an application (such as a global positioning system (GPS) or map application, or other types of applications) on a smartphone or other client computing device 125. The content items can be any type of content file, including an image file, an audio file, a video file, a HTML 5 file, a markup language file, a graphics file, or any multimedia file.

The content publisher computing device 120 can include servers or other computing devices operated by a content publishing entity to provide primary content for display or rendering at the client computing device 125. For instance, the content publisher computing device 120 can include a primary content operator that provides primary content for display or rendering on a web page or an application running on the client computing device 125. The primary content can include content other than that provided by the content publisher computing device 120, and the web page or application can include content slots configured for the display of third party content items from the content provider computing device 115. For instance, the content publisher computing device 120 can operate the website of a company and can provide content about that company for display on web pages of the website. The web pages can include content slots configured for the display of third-party content items of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client computing device 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page or application). For example, the client computing device 125 can be configured to run an application created by the content publisher computing device 120, and the application can be configured to display content items therein. The client computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, digital personal assistants, or any other computing device configured to communicate via the network 105. The client computing device 125 can be communication devices through which an end-user can submit requests to receive content. The requests can be requests to a search engine and the requests can include search queries. In some implementations, the requests can include a request to access a web page.

The content provider computing device 115, the content publisher computing device 120 and the client computing device 125 can include a processor and a memory, i.e., a processing circuit. The memory stores machine instructions that, when executed on the processor, cause the processor to perform one or more of the operations described herein. The processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions can include code from any suitable computer-programming language.

The content provider computing device 115, the content publisher computing device 120, and the client computing device 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices can be internal to a housing of the content provider computing device 115, the content publisher computing device 120 and the client computing device 125 (e.g., a built-in display, microphone, etc.) or external to the housing of content provider computing device 115, the content publisher computing device 120 and the client computing device 125 (e.g., a monitor connected to the content provider computing device 115, a speaker connected to the content provider computing device 115, etc.), according to various implementations. For example, the content provider computing device 115, the content publisher computing device 120 and the client computing device 125 can include an electronic display, which visually displays web pages using webpage data received from one or more content sources and/or from the data processing system 110 via the network 105. In some implementations, a content placement manager or third-party content provider can communicate with the data processing system 110 via the content provider computing device 115. In some implementations, the content placement manager or third-party content provider can communicate with the data processing system 110 via a user interface displayed on the user interface devices of the content provider computing device 115.

The data processing system 110 can include at least one server. For instance, the data processing system 110 can include a plurality of servers located in at least one data center or server farm. In some implementations, the data processing system 110 can include a third-party content placement system, e.g., a content server. The data processing system 110 can include at least one content request module 130, at least one content selection module 135, at least one script provider module 140, at least one battery usage analysis module 150, and at least one database 145. The content request module 130, the content selection module 135, the script provider module 140, and the battery usage analysis module 150, each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client computing device 125) via the network 105.

The content request module 130, the content selection module 135, the script provider module 140, and the battery usage analysis module 150 can include or execute at least one computer program or at least one script. The content request module 130, the content selection module 135, the script provider module 140, and the battery usage analysis module 150 can be separate components, a single component, or part of the data processing system 110. The content request module 130, the content selection module 135, the script provider module 140, and the battery usage analysis module 150 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include web pages, portions of webpages, third-party content items, and battery level scripts, among others, to serve to a client computing device 125. In some implementations the database 145 can include a list of identities of content items corresponding to content items, one or more of which can be potentially selected by the content selection module 135 for transmission to the one or more client computing devices 125. The database 145 also can include battery usage information corresponding to one or more of the identities in the list of identities of content items. The database 145 further can include correlations between one or more performance parameters associated with the client computing devices 125 and the battery usage information corresponding to the identities of one or more content items. Examples of performance parameters associated with the client computing devices 125 can include frame rate with which content is displayed, and a latency in displaying the content. The generation of the battery usage information and the correlations between the one or more performance parameters associated with the client computing devices 125 and the battery usage information is discussed further below.

The content request module 130 can receive a request for content from the client computing device 125. The request for content can include a request for an information resource, a request for third-party content, a request for a script or a combination thereof. In some implementations, the request for third-party content can include a request for an address or identifier of an information resource on which the third-party content is to be displayed. The request for third-party content can also include or identify one or more device parameters that can be used by the data processing system 110 to determine the content to provide in response to the request for content. For example, the device parameters can identify a size of a content slot within which to insert the requested content. The device parameters can identify a type of content associated with the information resource, a type of third-party content requested (e.g., text, image, video, etc.), client device information, size information for requested third-party content item or a combination thereof. In some implementations, the device parameters can identify a property of the device, for example a device type, operating system or any other property of the device. In some implementations, the content selection module 125 can, in real time, generate a content item that can include the content requested in addition to battery usage scripts discussed below.

The script provider module 140 provides, among others, battery usage scripts or computer programs that when executed at the client computing device 125 allow the measurement of battery usage at a client computing device 125. The content selection module 135 can send the battery usage script provided by the script provider module 140 to the requesting client computing device 125 in addition to the requested content item. The battery usage script can be configured to be executed when the requested content item is displayed or being rendered by the client computing device 125. For example, a web browser or an application running on the client computing device 125 can execute the battery usage script when displaying the requested content item. The battery usage script can be configured to utilize application programmable interfaces (APIs) provided by the web browser or the application, such as a battery status API, to gain access to the battery level of the client computing device 125. In some implementations, the battery usage script also can be configured to utilize the APIs to gain access to additional information regarding the battery of the client computing device, where the additional information can include whether the battery is being charged through an external power supply, the type of battery used and the like. The battery usage script can be configured to call the battery status API to retrieve battery level information at one or more time instances before, during, or after the duration for which the content item is displayed or rendered by the client computing device 125. In some implementations, the data processing system 110 can maintain a list or an appropriate data structure of content item identifiers indicating the content items for which battery usage scripts have been sent. The data processing system 110 can update the list or data structure with battery level information corresponding to the respective content item that is received from the client computing devices 125.

The battery usage script can additionally be configured to transmit the battery level information to the data processing system 110. The battery usage script can be configured to also transmit additional information in relation to the battery level information, where the additional information can include a content item identifier that uniquely identifies the content item being displayed or rendered corresponding to the battery level information, an identity of the browser or computing application, an identity of the operating system, an identity of the make or model of the client computing device 125, an indication whether the battery is being charged through an external power supply, and the like.

In some implementations, the battery usage script can include additional scripts or computer programs that can be transmitted to the client computing device 125 in conjunction with the requested content item. These additional scripts or computer programs can determine additional performance parameters of the client computing device 125 in relation to displaying or rendering the requested content item. For example, the script provider module 140 can provide a frame rate script which when executed at the client computing device 125, can determine the frame rate (measured, for example, in frames per second) at which the client computing device 125 displays or renders the content item. The script provide module 140 also can provide a latency script, which when executed at the client computing device 125, can determine the latency (for example, in milliseconds) in displaying or rendering the content item on the client computing device 125. The script provider module 140 also can provide scripts that monitor and record user behavior during the displaying or rendering of a content item. For example, the scripts can monitor and record an item clicked by the user, or a user action, such as requesting a different webpage, or terminating an application, that results in the termination of the display or rendering of the content item. The battery usage script can transmit the recorded information to the data processing system 110. Battery usage scripts are discussed in more detail below with reference to FIG. 3.

The battery usage analysis module 150 can be configured to process and analyze the battery usage information received from the battery usage scripts running on one or more client computing devices 125. The battery usage analysis module 150 can aggregate the battery usage information received from the one or more client computing devices 125 and determine relationships between a content item and a corresponding battery usage in displaying or rendering the content item. The battery usage analysis module 150 can utilize statistical tools such as regression models to determine the relationship. In some implementations, the battery usage analysis module 150 can determine a battery usage value associated with each content item for which it receives battery usage information. In some implementations, the battery usage analysis module 150 also can analyze additional information related to performance parameters such as frame rate, latency, and user behavior received from the client computing devices 125. Based on this information, the battery usage analysis module 150 can determine correlations between battery usage and the above mentioned performance parameters. Battery usage information and correlations associated with each content item generated by the battery usage analysis module 150 can be stored in the data processing system 110, for example, in the database 145. Additional details of the battery usage analysis module 150 are discussed below in relation to FIGS. 4-6.

The content selection module 135 can be configured to determine content to be transmitted to the client computing device 125 in response to a received request for content. The content selection module 135 can determine the content to be sent to the client computing device 125 based on information included in the request for content and battery usage information generated by the battery usage analysis module 150.

In some implementations, the content selection module 135 also can access the database 145 to determine battery information corresponding to the requested content item. The content selection module 135 can compare the battery usage information corresponding to the requested content item to a threshold value. Based on this comparison, the content selection module 135 can modify a policy for the selection of the content item for transmission to the requesting client computing device 125. Additional details of the content selection module 135 are discussed further below.

Figure 2:
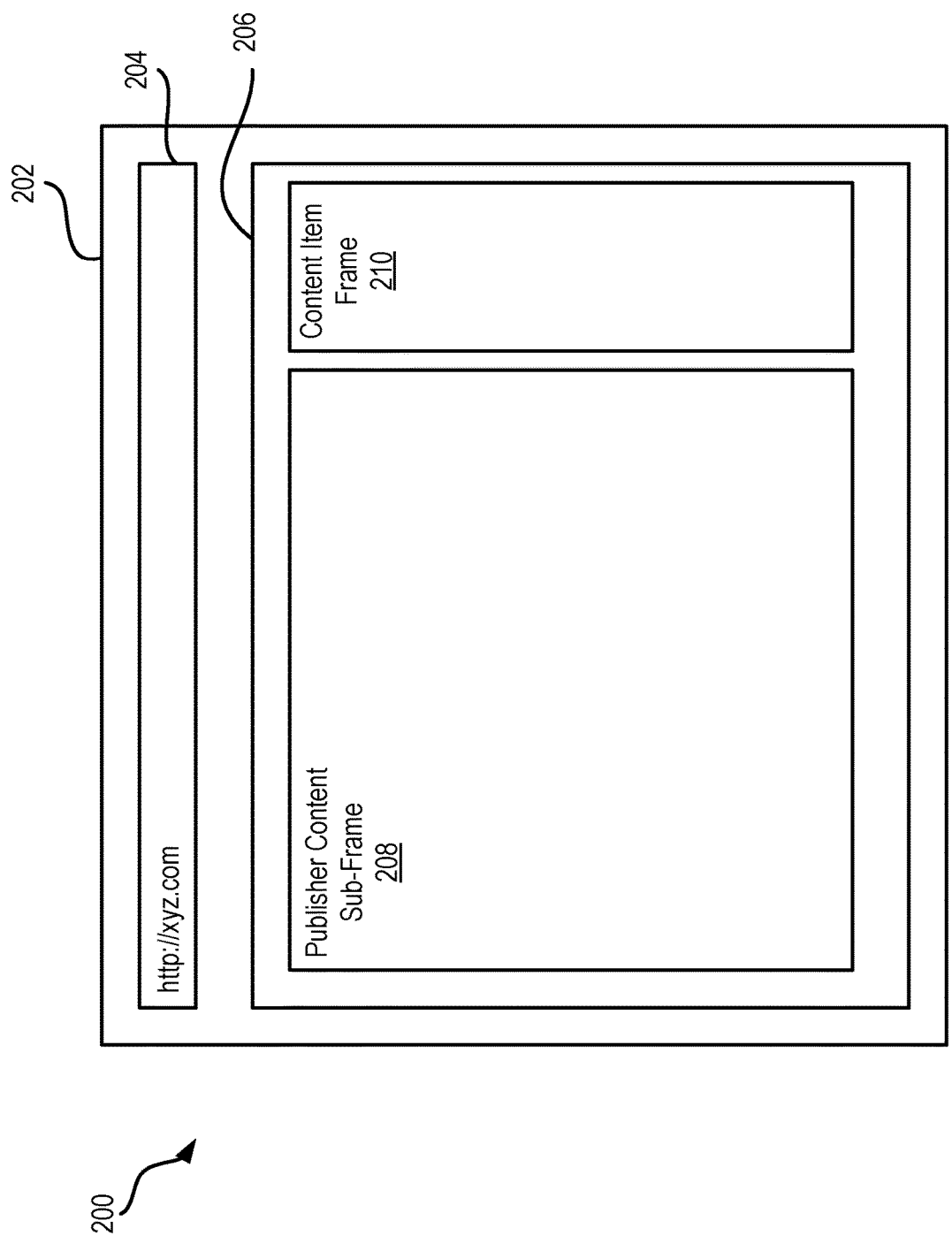
FIG. 2 depicts a representation of a portion of a user interface 200 of a computing application displayed at a client computing device shown in FIG. 1, according to some implementations.

FIG. 2 depicts a representation of a portion of an example user interface 200 of a computing application displayed at a client computing device. The example user interface 200 includes a web browser window 202, which in turn includes an address bar 204 and a view-frame 206. The address bar 204 accepts an address of a desired webpage, where the address can include an universal resource locator (URL). The view-frame 206 displays the content retrieved from the specified URL in the address bar 204. For example, in some implementations the view-frame 206 can display the contents of a webpage retrieved from a publisher, such as the content publisher computing device 120, corresponding to the URL.

The content received by the computing application can include sub-frames, such as a publisher content sub-frame 208 and a content item sub-frame 210. The publisher content sub-frame 208 can include content provided by a content publisher computing device 120. The content item sub-frame 210 can include a pointer, an IP address, or an URL of a computing device or a server that can provide one or more content item. The computing application can transmit a request over the network to the computing device corresponding to the address specified in the content item sub-frame 210. In some implementations, the address specified in the content item sub-frame 210 can correspond to an address of a digital processing system such as the data processing system 110 shown in FIG. 1. The computing application, in addition to transmitting a request for one or more content items, also can send device parameters pertaining to the computing application or the client computing device to the digital processing system. For example, the computing application can send its identity (such as, for example, XYZ web browser, JKL application, etc.). In response to the request, the computing application can receive one or more content item from the digital processing system or from a content provider computing device, such as the content provider computing device 115 shown in FIG. 1.

Figure 3:
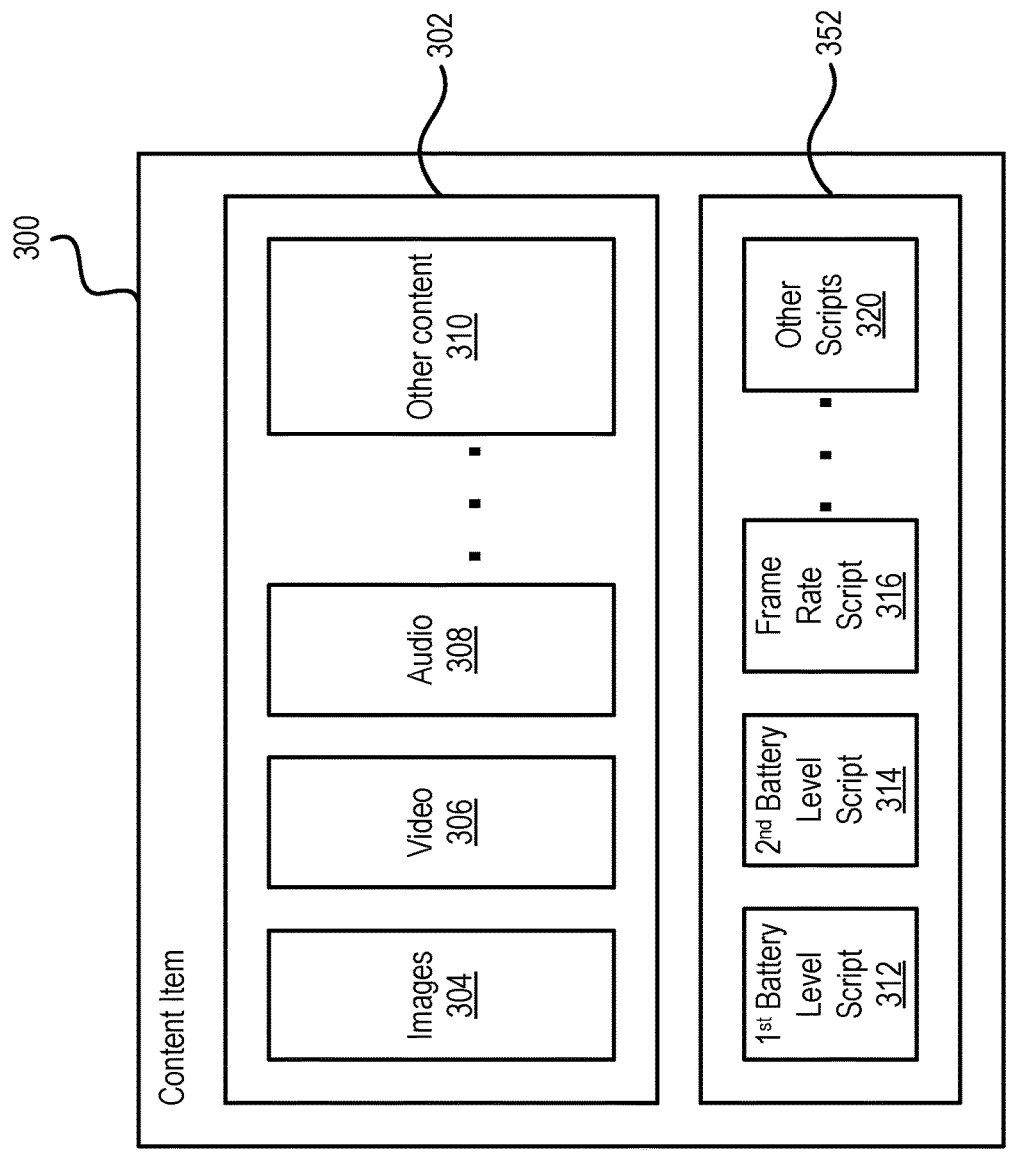
FIG. 3 shows a representation of a content item 300 received by a client computing device shown in FIG. 1, according to some implementations.

FIG. 3 shows a representation of an example content item 300 received by a client computing device 125. As mentioned above, the content item received by the client computing device 125 can include content to be displayed or rendered on the client computing device 125 and one or more scripts provided by the script provider module 140 (FIG. 1). The content item 300 includes at least a content portion 302 and a battery usage script 352. The content portion 302 can include content that is to be displayed or rendered on the client computing device. For example, as shown in FIG. 3, the content portion 302 can include one or more of images 304, videos 306, audio 308, and other content 310. The battery usage script 352 can include one or more scripts that are to be executed by the computing application, such as the computing application discussed above in relation to FIG. 2. For example, as shown in FIG. 3, the battery usage script 352 can include one or more scripts such as a first battery level script 312, a second battery level script 314, a frame rate script 316 and one or more other suitable scripts 320.

The first battery level script 312 can include instructions to acquire battery usage at a first instant in time when the content item is displayed or rendered on the client computing device 125. The second battery level script 314 can include instructions to acquire battery usage at a second instant in time when the content item is displayed or rendered on the client computing device 125. In some implementations, the first instant in time can correspond to the time at which the content item is first displayed or rendered on the client computing device 125. In some implementations, the second instant in time can correspond to a few milliseconds or seconds after the first instant. For example, the second instant in time can be between about 5 seconds and about 25 seconds after the first instant. In some other examples, the second instant in time can be a few milliseconds to about a few seconds or a few tens of seconds from the first instant. In yet other examples, the duration between the first and second instants can be a percentage of the duration for which the content item is displayed or rendered on the client computing device 125. In some implementations, the second instant in time can correspond to a time when the displaying or rendering of the content on the client computing device 125 has been completed. Both the first battery level script 312 and the second battery level script 314 can acquire the battery level at the first time instant and the second time instant, respectively, by communicating with an API, such as a battery level API, provided by the web browser or the computing application in which the content item 300 is displayed or rendered.

In some implementations, the battery usage script 352 can include a script that is configured to acquire battery levels at two instants of time corresponding to the first instant and second instant of time discussed above. One example pseudo-code representing a battery level script is shown below:

```
var SECS_TO_REPORT = 15;
var measureBattery = function( ) {
  navigator.getBattery( ).then(function(battery){
    var initialBattery = battery.level;
    window.setTimeout(function( ) {
      report(battery.level < initialBattery);
    }, SECS_TO_REPORT * 1000);
  });
}
```

Another example pseudo-code representing a battery level script is shown below:

```
var SEC_TO_REPORT = 15;
var SAMPLES_TO_REPORT = 5;
var measureBattery = function( ) {
  navigator.getBattery( ).then(function(battery) {
    var measures = [ ];
    measures.push(battery.level);
    var id = window.setInteval(function( ) {
      measures.push(battery.level);
      if (measures.length == SAMPLES_TO_REPORT) {
        window.clearInteravl(id);
        report(measures);
      }
    }, SEC_TO_REPORT * 1000);
  });
}
```

In the above example pseudo-codes of an example battery level scripts, the SECS_TO_REPORT variable specifies a difference in time (15 seconds) between two instants in time at which the battery level is acquired, where the first of the two instants in time corresponds to a time when the displaying or rendering of the content item begins. The SAMPLES_TO_REPORT variable can specify the number of instants (here, five) of time for which the battery level is acquired. Further, the script is configured to report the battery levels only if the battery level measured at the first instant is greater than the battery level at the second instant.

The battery usage script 352 also can include a frame rate script 316, which determines time intervals between frames displayed by the web browser or the computing application. Under typical operation, the web browser or the computing application can display image frames on the client computing device 125 display at a predetermined frame rate, such as 60 frames per second. However, in some example implementations, if an operation performed on the client computing device 125 were to cause an overload on the processing resources of web browser or the computing application, the frame rate would decrease. That is, under overloaded conditions, the time interval between subsequent frames can increase. The decrease in the frame rate, or an increase in the interval between displaying subsequent frames, can be used as an indicator of overloading, if any, caused by the displaying or rendering of the content item. Similar to the battery level scripts discussed above, the frame rate script 316 also can determine the frame rates at one or more instants in time, such as a first instant in time when the content item is first displayed or rendered on the client computing device and another instant in time that is a predetermined time period after the first instant. In some example implementations, the frame rate script 316 can use APIs such as requestAnimationFrame and requestIdleCallback to determine the frame rate or time intervals between subsequent frames.

The battery usage script portion 352 also can include other scripts 320, which can include scripts such as a latency script, which determines the latency in displaying or rendering the content item. The other scripts 320 also can include scripts that monitor user behavior when the content item is displayed or rendered on the client computing device 125. For example, the other scripts 320 can include a script for determining whether a user clicked on a content item. The other scripts 320 also can include a script for determining whether a user moves to a different webpage or terminates the computing application when the content item is being displayed or rendered.

Each of the scripts discussed above can also be configured to transmit information acquired at the client computing device 125 to the battery usage analysis module 150. In some implementations, one or more scripts can be configured to send the acquired information to the battery usage analysis module 150 as soon as it is acquired. In some other example implementations, one or more scripts can be configured to temporarily store the information locally at the client computing device 125, and transmit the stored information to the battery usage analysis module 150 at predetermined intervals, or after the size of the stored data reaches a certain threshold.

In some implementations, the battery level scripts can be configured to transmit battery level information battery usage analysis module 150 only if there is a drop in the battery level after the first time instant. In some implementations, the battery level scripts can be configured to transmit an indication (e.g., battery_drop=TRUE/FALSE), without transmitting the magnitude of the drop in battery level, to the battery usage analysis module 150 if there is a drop in the battery level. In some implementations, the battery level scripts can be configured to transmit to the battery usage analysis module 150 the magnitude of drop in the battery level. In some implementations, the battery level scripts can be configured to register an event listener script to detect battery level changes, and report the changes to the battery usage analysis module 150. In some implementations, the battery scripts can be configured to acquire values or levels of performance parameters that have been discussed above in relation to the frame rate script 316 and the other scripts 320, and transmit the acquired information to the battery usage analysis module 150.

In some implementations, one or more of the scripts discussed above can be located at the web browser or the computing application instead of being transmitted in the content item 300. In particular, the one or more scripts can be executed by the web browser or the computing application when a received content item is displayed or rendered on the client computing device 125. In some implementations, the data processing system 110 can provide one or more scripts to the web browser or the computing application on the client computing device 125 once with instructions to store the one or more scripts locally at the client computing device 125 and to execute the scripts when displaying or rendering content items. Having one or more scripts stored at the client computing device 125 can reduce the amount of data being transferred from the data processing system 110, thereby reducing impact on a data bandwidth between the data processing system 110 and the client computing device 125.

Figure 4:
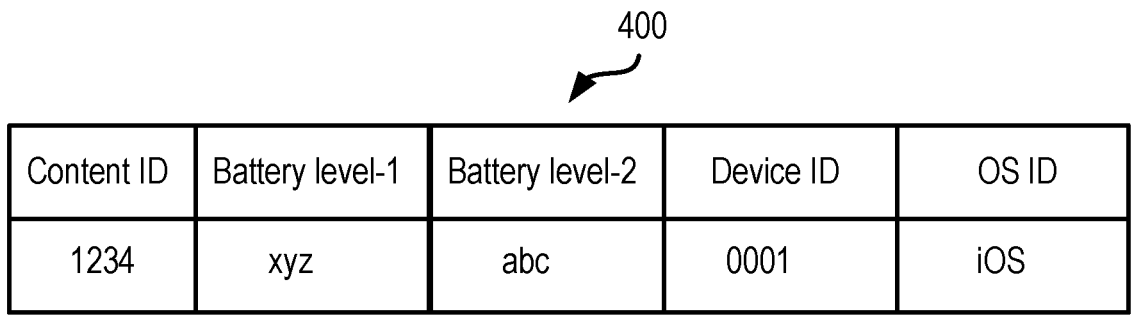
FIG. 4 shows a representation of information 400 transmitted by a content item script executing on the client computing device to the battery usage analysis module of the data processing system shown in FIG. 1, according to some implementations.

FIG. 4 shows a representation of example information 400 transmitted by a content item script to the battery usage analysis module. In particular, the information 400 can include a Content ID, Battery level-1, Battery level-2, Device ID, and OS ID. The Content ID can specify an identification corresponding to the content item displayed or rendered on the client computing device 125. The Battery level-1 can specify the battery level acquired at a first instant in time, and the Battery level-2 can specify the battery level acquired at a second instant in time. In some implementations, additional Battery levels also can be included, such as battery levels at additional instants of time, difference in the battery levels measured at the first and the second instants in time, difference in the battery levels measured at any two instants in time from all the instants received, indication of whether there was a battery level drop, indication that the battery was being charged, etc. The information 400 also can include the time stamps associated with each instant in time for which the battery level is measured or transmitted. The Device ID can specify the type of the client computing device 125. For example, the Device ID can include the names or references associated with device types such as mobile, tablet, laptop, desktop, digital personal assistant, etc. The OS ID can provide information about an operating system running on the client computing device 125.

In some implementations, the information 400 transmitted to the battery usage analysis module 150 can also include values of additional performance parameters such as frame rate, frame interval duration, and user behavior acquired by one or more scripts discussed above.

Figure 5:
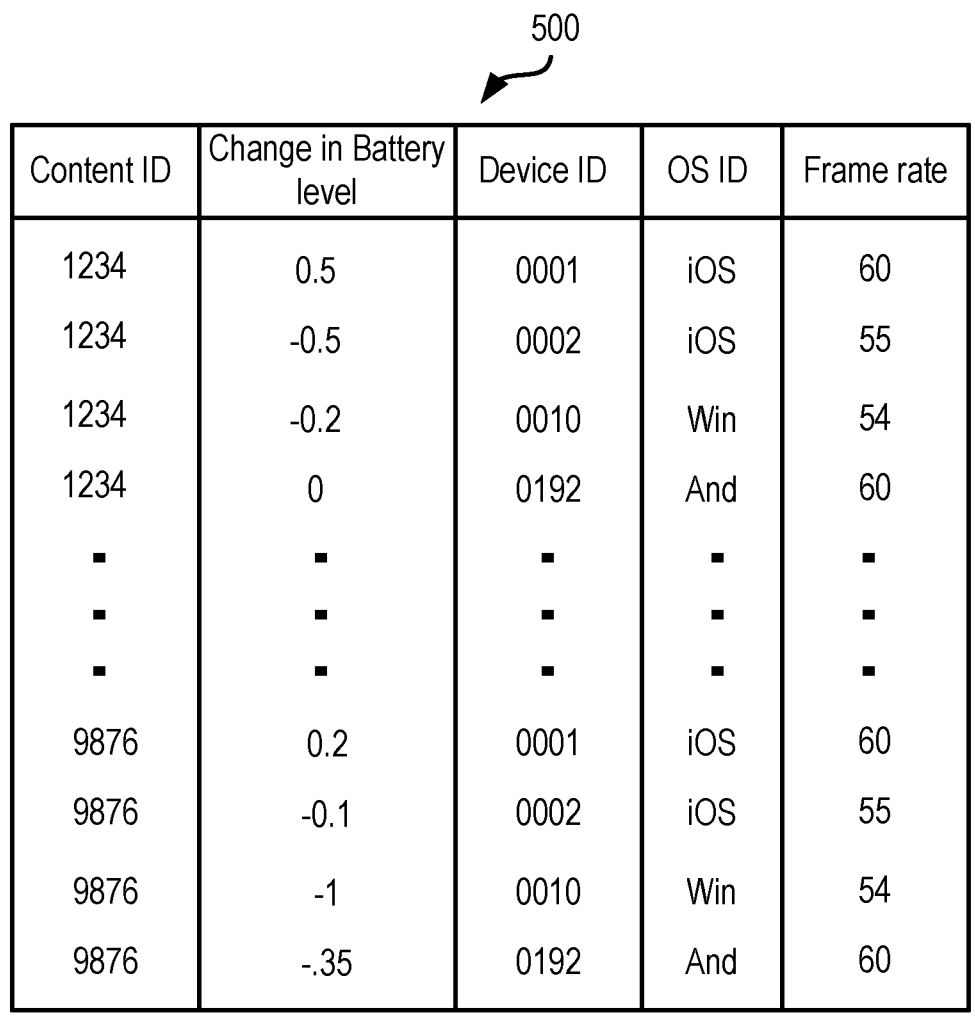
FIG. 5 depicts a representation of battery usage aggregate data at the data processing system shown in FIG. 1, according to some implementations.

FIG. 5 depicts a representation of an example battery usage aggregate data 500 at the data processing system 110. In some implementations, the battery usage aggregate data 500 can be stored in the database 145. The battery usage data 500 can be generated by the battery usage analysis module 150 based on the information, such as the information 400 shown in FIG. 3, received from scripts executing at one or more client computing devices 125. For example, the battery usage data 500 can include a Content ID, a Change in Battery level, a Device ID, an OS ID, and a Frame Rate. The Content ID, as mentioned above, specifies an unique identifier associated with a content item. The battery usage data 500 includes several entries associated with a Content ID "1234" and with Content ID "9876". While FIG. 5 shows entries associated with only two content items, it is understood that the battery usage data 500 can include additional entries associated with other Content IDs corresponding to other content items. Each entry associated with the same Content ID includes information received from a client computing device 125 with regards to displaying or rendering the content item corresponding to the Content ID. For example, the battery usage data 500 can include, for a content item having a Content ID "1234," a Battery level of 0.5 received from a client computing device 125 having a Device ID "0001" running an "iOS" operating system with a recorded Frame Rate of 60 frames per second.

The Change in Battery level can indicate a difference between two battery levels received from the client computing device 125. The battery level acquired at the client computing device 125 can correspond to a cumulative effect of all the processes running on the client computing device at that time. Based on the time at which the battery level is measured, one or more of those processes can correspond to displaying or rendering the content item. As the occurrence of other processes on the client computing device can be unpredictable, the difference between two battery levels can be positive or negative. For example, a negative number can indicate a reduction in the battery level, while a positive number can indicate an increase in the battery level. The numbers can indicate a magnitude or a scaled magnitude of the change in the battery level. In some other implementations, the Change in Battery level can represent a ratio of the battery level acquired at a first time instant to the battery level acquired at a second time instant during the displaying or rendering of the content item.

In some implementations, the battery usage data 500 can include additional columns specifying information related to other metrics or performance parameters corresponding to the content items. For example, the battery usage data 500 can include a column for Latency, which specifies the latency in loading the content item. The battery usage data 500 can include data associated with other performance parameters for which values have been received by the battery usage analysis module 150.

In some implementations, the battery usage data 500 can include tens, hundreds, thousands, hundreds of thousands, or more entries associated with each Content ID. That is, the battery usage analysis module 150 can receive data associated with the displaying or rendering the same content item at tens, hundreds, thousands, hundreds of thousands, or more client computing devices 125. The battery usage analysis module 150 can utilize the large number of data points associated with each content item to determine the battery usage for displaying or rendering that content item in general. As discussed below, the content selection module 135 can maintain a list of content items that can potentially be transmitted to the client computing device, and can modify a policy for selecting a content item based on the determined battery usage. In some implementations, the battery usage analysis module 150 can process the battery usage data 500 using statistical tools to generate statistics such as average battery levels, average change in battery levels, average frame rate, etc. for each content item. In some other implementations, the battery usage analysis module 150 can utilize regression models to determine correlations between the battery level and other performance parameters such as frame rate, latency, or user behavior.

The battery usage data 500 can be stored in the database 145 and can be indexed based on one or more columns, such that the battery usage analysis module 150 can search and retrieve data related to each column. In some implementations, the battery usage data 500 can be arranged in a manner different from that shown in FIG. 5. For example, the battery usage data can be stored in the database 145 as multiple tables of only two columns, where one of the columns includes the Content ID, and the other column includes one of the Change in Battery level, the Device ID, the OS ID, the Frame rate, and other performance parameters. Such a data arrangement can facilitate determining battery usage for a content ID based on one or a combination of aspects such as Device ID, and OS ID. For example, the battery usage analysis module 150 can determine the estimate of displaying or rendering the content item associated with the Content ID "1234" on client computing devices 125 running the same operating system (identified by the same OS ID) to determine an estimate of battery usage for a particular operating system. Additionally or alternatively, the battery usage analysis module can determine an estimate of battery usage associated with a particular device type. The battery usage analysis module can therefore be used to determine an estimate of battery usage associated with displaying or rendering a content item, taking into account other properties of a client device associated with battery usage, and can, for example, be used to determine battery usage for specific device properties. The determined battery usage can, for example, be used to provide content items to a device based upon its properties.

FIG. 6 depicts a representation of battery usage estimate data 600. The battery usage estimate data 600 can be generated by the battery usage analysis module 150 based on the battery usage data 500 shown in FIG. 5. In particular, the battery usage estimate data 600 can be a result of the processing of the battery usage data 500 using one or more statistical tools. The battery usage estimate data can include two columns: a Content ID and a Battery Usage Estimate column. The Content ID can specify a unique identifier for a content item, and the Battery Usage Estimate specifies an estimate (or a battery usage value) of the battery usage in displaying or rendering the content item. In some implementations, the battery usage estimate data 600 can include the battery usage estimate of a set of content items for which the battery usage analysis module 150 receives battery usage information from the one or more client computing devices 125. The Battery Usage Estimate can be based on the Change in Battery level discussed above in relation to FIG. 5. In one or more examples, the Battery Usage Estimate associated with a content item can be determined based on an average of all Change in Battery levels received for that content item. In some examples, other statistical estimation tools also can be utilized to determine the Battery Usage Estimate. In some implementations, the battery usage analysis module 150 can utilize the battery usage data 500, and any additional data received from the client computing devices 125, to determine the relative power consumption of the content items, instead or estimating an actual amount of battery usage. The battery usage analysis module 150 can periodically update the battery usage estimate data 600 based on new or updated entries received in the battery usage data 500.

In some implementations, the battery usage analysis module 150 can generate correlations between the estimated battery consumption of a content item and additional performance parameters such as frame rate, latency, user behavior, etc. For example, the battery usage analysis module 150 can determine a correlation between the Battery level and the Frame rate for one content item or several content items. If a strong correlation exists between the Battery level and the Frame rate, the battery usage analysis module 150 can establish that content items having low Frame rates also exhibit high power consumption. Determining a strong correlation can allow the battery usage analysis module 150 to estimate the power consumption of a content item even if there is no battery level data (or unreliable battery level data) available for that content item. That is, the battery usage analysis module 150 can analyze the correlated performance parameters to estimate the power consumption of a content item.

Referring to FIG. 1, the content selection module 135 can utilize the battery usage estimate data 600 in implementing a policy for selecting and transmitting content items requested by the one or more client computing devices 125. In some implementations, the content selection module 135 can implement a policy of restricting transmitting requested content items that consume an undesirable amount of battery power for their display or rendering. The content selection module 135 can set a predetermined threshold battery level, and compare the Battery Usage Estimate corresponding to each requested content item. If the Battery Usage Estimate for the requested content item is less than the predetermined threshold, the content selection module 135 can deny the request for that particular content item. For example, referring to FIG. 6, the content selection module 135 can set the threshold battery level to −0.4. If the content selection module 135 receives a request for a content item having a Content ID "9876", the content selection module 135 can search the battery usage estimate data 600 for an entry having a Content ID "9876." As this entry exists in the battery usage estimate data 600, the content selection module 135 determines whether the Battery Usage Estimate of −0.5 for Content ID "9876" is less than the threshold battery level of −0.4. As the Battery Usage Estimate is less than the threshold battery level, the content selection module 135 can deny the request by the client computing device 125 for that content item. In some implementations, battery usage associated with a content item and a particular client device property may be stored and the content selection module may base selection of content items on a property associated with a requesting client device and a Battery Usage estimate for the client device and the property. In some implementations, the content selection module 135 can maintain a list of content items that can be potentially delivered to the client computing devices 125. If the content selection module 135 determines that a content item on the list of content item has an undesirable Battery Usage Estimate, the content selection module 135 can remove that content item from the list. In some implementations, the content selection module 135 can flag the content items in the list that have an undesirable Battery Usage Estimate.

In some implementations, the content selection module 135 can implement a policy of modifying a content item determined to have an undesirable Battery Usage Estimate. For example, the content selection module 135 can modify the quality of the content item, such as by reducing the size of the images displayed, reducing the number of frames displayed in a video or an animation, and the like, to reduce the amount of power consumed in displaying or rendering the content item at the client computing device 125. In some implementations stored content items can be modified to improve the Battery Usage Estimate associated with the content item. For example, analysis of a plurality of content items and associated battery usage by client devices when the content items are displayed may identify a particular content item property associated with a relatively high Battery Usage Estimate. The content items may be modified to generate modified content items by modifying the content item property to a content item property associated with a relatively low Battery Usage Estimate. For example, it may be determined that videos having a relatively high frame rate use a relatively high amount of battery, and content items having a relatively high frame rate may be modified to lower the frame rate to improve the battery usage. The effect of modification of a content item property may be determined by providing the modified content items to a plurality of client devices for display of the modified content item and analyzing battery usage of the client devices when the modified content items are displayed, as described above, to determine content item properties that are associated with relatively low battery usage.

In some implementations, the content selection module 135 can, in addition to denying the request for the content item, transmit a message to the content provider computing device 115, which can be a source of the rejected content item, that the power consumption associated with the content item is unacceptable. In response, the content provider computing device 115 may notify an entity that generates the content item regarding the unacceptable power consumption of that content item, or provide the content selection module 135 with a replacement content item that consumes relatively less battery power.

In some implementations, it can be desirable to determine an estimate of a power consumption of a new content item received by the content selection module 135 prior to sending the content item to the client computing devices 125. In some implementations, the content selection module 135 can compare aspects of content items having high power consumption in the battery usage estimate data 600 with corresponding aspects of the new content item. For example, the content selection module 135 can compare aspects such as size and type of content (image, video, audio). If the new content item is substantially similar to the high power consuming content items in these aspects, then the content selection module 135 can determine that the new content item also may consume high battery power. Based on this determination, the content selection module 135 can restrict the inclusion of the new content item in the list of content items. In some implementations, the content selection module 135 can use a machine learning algorithm to analyze the properties of high power consuming content items, and based on the analysis, provide a prediction whether a new content item would consume battery power greater than a predetermined threshold. The content selection module 135 can use the prediction provided by the machine learning algorithm to determine whether the new content item can be included in the list of content items.

Figure 7:
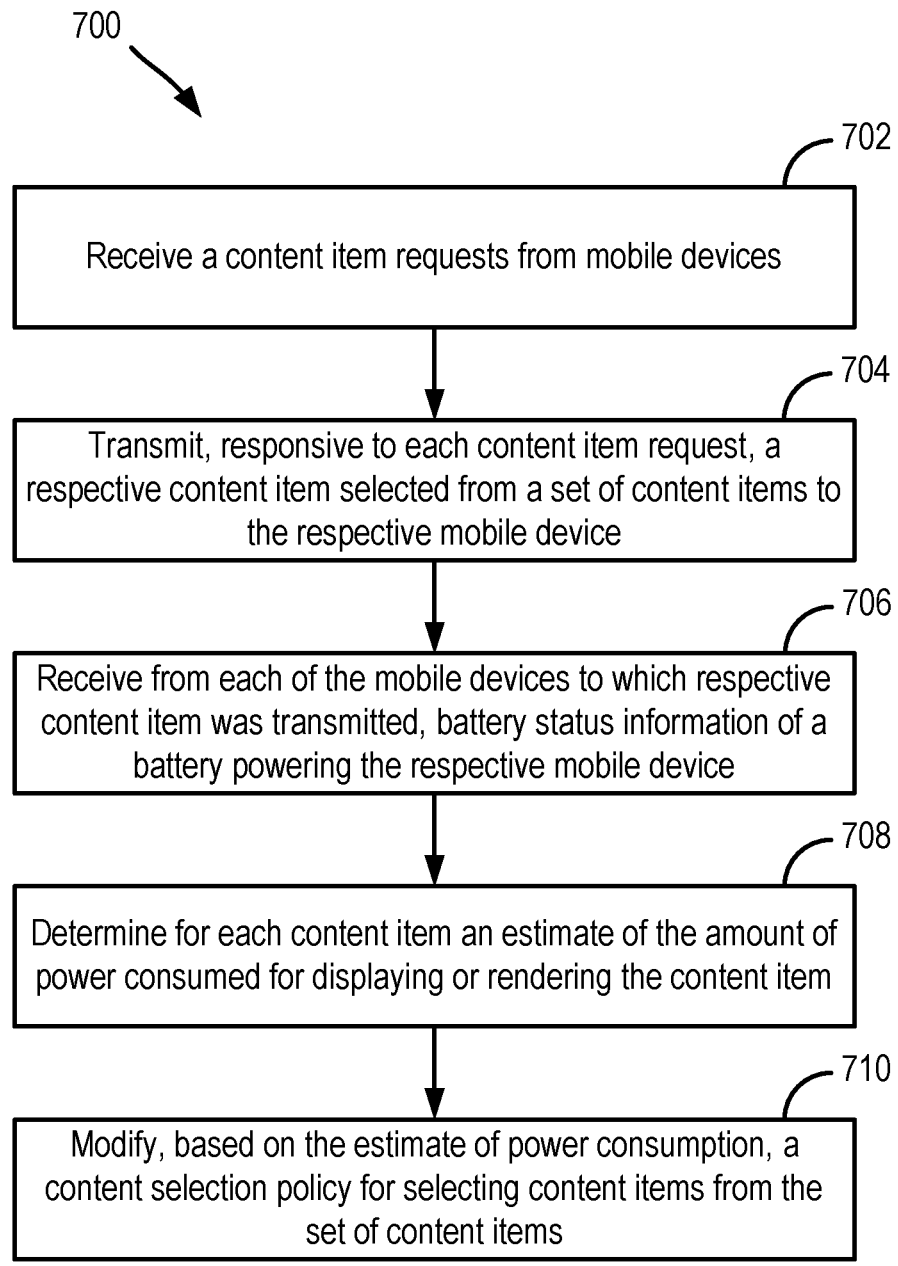
FIG. 7 shows a flow diagram depicting a method for managing transmission of content items to client computing devices shown in FIG. 1, according to some implementations.

FIG. 7 shows a flow diagram depicting an example method 700 for managing transmission of content items to client computing devices. The method 700 includes receiving content item requests from mobile devices (block 702). The method 700 further includes transmitting, responsive to each content item request, a respective content item selected from a set of content items to the respective mobile device (block 704). The method 700 also includes receiving from each of the mobile devices to which a respective content item was transmitted, battery status information of a battery powering the respective mobile device (block 706). The method 700 additionally includes determining from each content item an estimate of the amount of power consumed for displaying or rendering the content item (block 708). The method 700 further includes modifying, based on the estimate of power consumption, a content selection policy for selecting content items from the set of content items (block 710).

As mentioned above, the method 700 includes receiving content item requests from mobile devices (block 702). As discussed above in relation to FIGS. 1 and 2, the data processing system 110 can receive requests from client computing devices 125 for content items that are to be displayed or rendered on the respective client computing device 125. Also mentioned above, the client computing devices 125 can include a mobile device, such as a phone, a smartphone, a laptop, a tablet, a phablet or any other device that is powered by a battery. As shown in FIG. 2, the content item sub-frame 210 includes an address or reference that can be used by the client computing device 125 to request a content item that is to be displayed in the content item sub-frame 210. The request can be sent to the data processing system 110, and in particular to the content selection module 135. The request can include an identity of the requested content item.

The method 700 further includes transmitting, responsive to each content item request, a respective content item selected from a set of content items to the respective mobile device (block 704). As discussed above in relation to FIGS. 1 and 6, the content selection module 135 maintains a list of content items that can be provided to the client computing devices 125. The content selection module 135 can select a content item from the list of content items and send the selected content item to the requesting client computing device.

The method also includes receiving from each of the mobile devices to which a respective content item was transmitted, battery status information of a battery powering the respective mobile device (block 706). As discussed above in relation to FIGS. 1, 4 and 5, the battery usage analysis module 150 receives battery status information of a battery powering the respective client computing device 125. In particular, the battery usage analysis module 150 receives battery levels acquired at one or more time instants at the client computing device during a display or a rendering of a content item on the client computing device 125. The client computing device 125 can send the battery levels in addition to an identifier identifying the content item associated with the battery levels.

The method further includes determining from each content item an estimate of the amount of power consumed for displaying or rendering the content item (block 708). At least one example of this method block has been discussed above in relation to FIGS. 1-6. For example, as discussed above in relation to FIG. 6, the battery usage analysis module 150 can determine a battery usage estimate or a battery usage value for each content item based on the battery level information received from the client computing devices 125. For example the battery usage analysis module 150 can use statistical analysis to analyze the received battery levels, and based on the analysis estimate the battery usage value associated with displaying or rendering a content item on a client computing device 125.

The method further includes modifying, based on the estimate of power consumption, a content selection policy for selecting content items from the set of content items (block 710). As discussed above in relation to FIGS. 1 and 6, the content selection module 135 can modify a policy of selecting a content item from a list of content items based on the battery usage estimate determined by the battery usage analysis module 150. For example, the content selection module can modify the content selection policy by restricting the selection of only those content items for which the battery consumption for display and rendering is less than a predetermined threshold.

Figure 8:
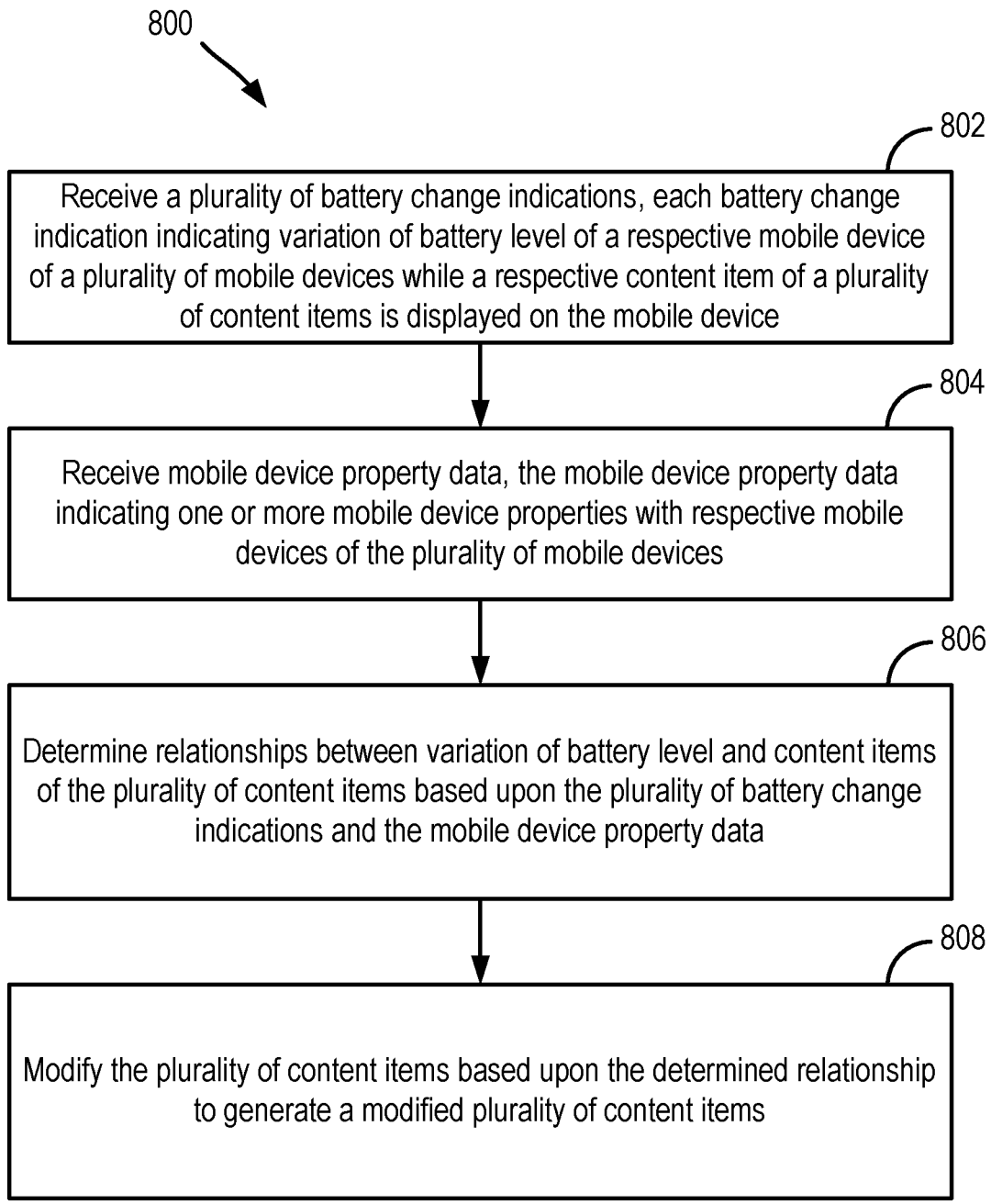
FIG. 8 shows a flow diagram depicting another method for managing transmission of content items to client computing devices shown in FIG. 1, according to some implementations.

FIG. 8 shows flow diagram depicting another example method 800 for managing transmission of content items to client computing devices. The method 800 includes receiving a plurality of battery change indications, each battery change indication indicating variation of battery level of a respective mobile device of a plurality of mobile devices while respective content item of a plurality of content items is displayed on the mobile device (block 802). The method 800 further includes receiving mobile device property data, the mobile device property data indicating one or more mobile device properties with respective mobile devices of the plurality of mobile devices (block 804). The method also includes determining relationships between variation of battery level and content items of the plurality of content items based upon the plurality of battery change indications and the mobile device property data (block 806). The method 800 additionally includes modifying the plurality of content items based upon the determined relationships to generate a modified plurality of content items (block 808).

As mentioned above, the method 800 includes receiving a plurality of battery change indications, each battery change indication indicating variation of battery level of a respective mobile device of a plurality of mobile devices while respective content item of a plurality of content items is displayed on the mobile device (block 802). As discussed above in relation to FIGS. 1, 4 and 5, the battery usage analysis module 150 can receive battery levels indicating any changes in battery levels at client computing devices 125 while a content item is displayed or rendered on the client computing device 125. The received battery levels can correspond to battery levels acquired at the respective client computing device 125 at at least two instants in time. The difference in the battery levels can indicate variations in the battery levels while the respective content item is being displayed or rendered.

The method 800 also includes receiving mobile device property data, the mobile device property data indicating one or more mobile device properties with respective mobile devices of the plurality of mobile devices (block 804). As discussed above in relation to FIGS. 1, 4 and 5, the battery usage analysis module 150, in addition to receiving battery levels, also can receive data related to the client computing device 125. For example, the battery usage analysis module 150 can receive information regarding a frame rate and latency at the client computing device 125, an operating system of the client computing device, a device type associated with the client computing device or any other information that may affect battery usage of the client computing device while content is displayed at the client computing device.

The method 800 further includes determining relationships between variation of battery level and content items of the plurality of content items based upon the plurality of battery change indications and the mobile device property data (block 806). As discussed above in relation to FIGS. 1-6, the battery usage analysis module 150 can determine the amount of battery usage in displaying or rendering a content item. The battery usage analysis module 150 can determine this relationship based on the battery level information received from the client computing devices 125.

The method additionally includes modifying the plurality of content items based upon the determined relationships to generate a modified plurality of content items (block 808). As discussed above in relation to FIGS. 1 and 6, the content selection module 135 can modify a set of content items based on an estimate of battery consumption in displaying or rendering each of the content items in the set of content items. For example, the content selection module 135 can remove a content item from the set of content items if an estimate of battery consumption in displaying or rendering that content item is above a threshold value. Additionally or alternatively, a property of one or more content items of the plurality of content items may be modified based upon a determination that the property adversely affects battery consumption. In some embodiments a plurality of sets of content items may be generated, with each set of content items being associated with a client device property, for example where it is determined that battery usage associated with a content item varies for different client device properties.

Figure 9:
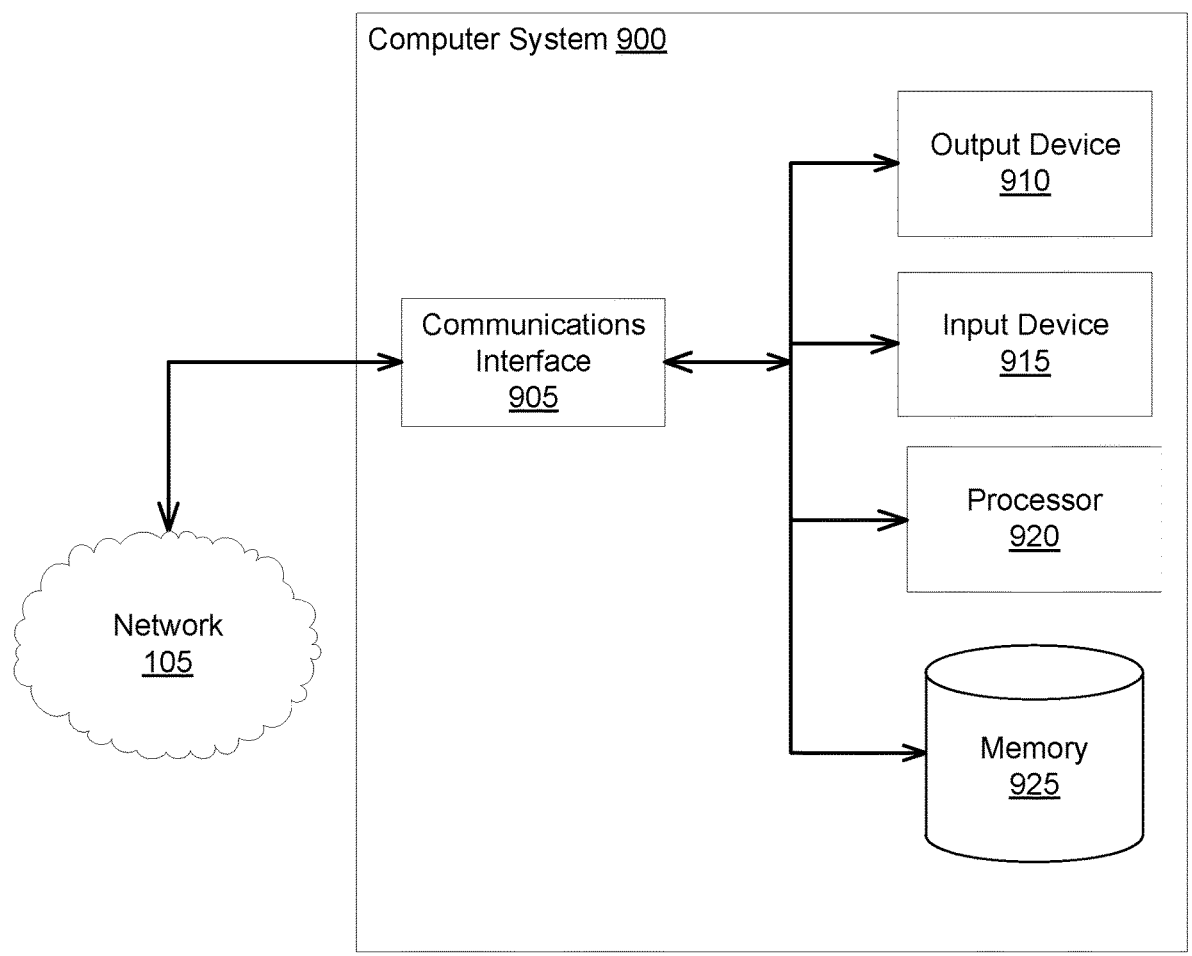
FIG. 9 is a block diagram depicting a general architecture for a computer system that may be employed to implement elements of the systems and methods described and illustrated herein according to some implementations.

FIG. 9 is a block diagram depicting a general architecture for a computer system 900 that may be employed to implement elements of the systems and methods described and illustrated herein (including the data processing system 110 and its components such as the content request module 130, the content selection module 135, the script provider module 140, and the battery usage analysis module 150) according to some implementations. The computer system 900 can be used to provide information via the network 105 for display. The computer system 900 of FIG. 9 includes one or more processors 920 communicatively coupled to memory 925, one or more communications interfaces 905, and one or more output devices 910 (e.g., one or more display units) and one or more input devices 915. The processors 920 can be included in the data processing system 110 or the other components of the data processing system 110 such as the content request module 130, the content selection module 135, the script provider module 140, and the battery usage analysis module 150.

In the computer system 900 of FIG. 9, the memory 925 may include any computer-readable storage media, and may store computer instructions such as processor-executable instructions for implementing the various functionalities described herein for respective systems, as well as any data relating thereto, generated thereby, or received via the communications interface(s) or input device(s) (if present).

Referring again to the data processing system 110 of FIG. 1, the data processing system 110 can include the memory 925 to store information related to the availability of inventory of one or more content units, reservations of one or more content units, among others. The memory 925 can include the database 145. The processor(s) 920 shown in FIG. 9 may be used to execute instructions stored in the memory 925 and, in so doing, also may read from or write to the memory various information processed and or generated pursuant to execution of the instructions.

The processor 920 of the computer system 900 shown in FIG. 9 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). While not shown explicitly in the system of FIG. 1, one or more communications interfaces facilitate information flow between the components of the system 900. In some implementations, the communications interface(s) may be configured (e.g., via various hardware components or software components) to provide a website as an access portal to at least some aspects of the computer system 900. Examples of communications interfaces 905 include user interfaces (e.g., web pages), through which the user can communicate with the data processing system 110.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 900 or the data processing system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the present disclosure or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

In implementations of the present disclosure, the content or content items may be any suitable content. In some applications the content or content items may be advertisements ("ads"), but the present disclosure is not limited to this. When the content or content items are advertisements, the content server 205 may be an ad server and/or the third party content provider may be an advertiser.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What we claim is:

1. A method, comprising:
    receiving, by one or more processors coupled to memory from each client device of a plurality of client devices at which a content item is presented, rendering performance data of the content item corresponding to a display of the content item at the client device;
    receiving, by the one or more processors from each client device of the plurality of client devices, mobile device property data that indicates one or more mobile device properties of the client device corresponding to the received rendering performance data;
    determining, by the one or more processors, a relationship between the content item and the rendering performance data of the content item that corresponds to the display of the content item at each of the plurality of client devices, the relationship based on d the corresponding mobile device property data; and
    modifying, by the one or more processors, a content selection policy associated with the content item based on the relationship between the content item and the rendering performance data to restrict the content item from subsequent selection in response to requests for content.

2. The method of claim 1, further comprising modifying, by the one or more processors, the content item to generate a modified content item.

3. The method of claim 2, wherein the modified content item is associated with a mobile device property, and the method further comprises providing, by the one or more processors, the modified content item to mobile devices based on properties associated with the mobile devices.

4. The method of claim 1, wherein the content item is associated with content item properties, and wherein determining the relationship between the content item and the rendering performance data of each of the plurality of client devices comprises determining relationships between latency and the content item properties.

5. The method of claim 2, further comprising
    modifying, by the one or more processors, the content item based on a second relationship between content item properties of the content item and the rendering performance data.

6. The method of claim 1, wherein determining the relationship between the content item and the rendering performance data of each of the plurality of client devices is performed using a regression model.

7. The method of claim 1, wherein the rendering performance data is obtained by:
    transmitting, by the one or more processors, the content item to a mobile device, the content item comprising content to be displayed at the client device and a script, wherein the script is arranged to cause latency of the content item to be measured at a first time and at a second time and to transmit the rendering performance data between the first and second time to the one or more processors.

8. The method of claim 7, wherein the script is embedded in the content item.

9. The method of claim 1, wherein the one or more mobile device properties comprise one or more of a web page displayed with the content item, a data communication protocol, and a screen brightness.

10. A non-transitory computer readable medium carrying a computer program comprising computer readable instructions configured to cause a computer to carry out a method according to claim 1.

11. A computer system, comprising:
a memory storing processor readable instructions; and
one or more processors arranged to read and execute processor readable instructions stored in the memory that cause the one or more processors to:
receive, from each client device of a plurality of client devices at which a content item is presented, rendering performance data of the content item corresponding to a display of the content item at the client device;
receive, from each client device of the plurality of client devices, mobile device property data, the mobile device property data that indicates one or more mobile device properties of the client device corresponding to the received rendering performance data;
determine a relationship between the content item and the rendering performance data of the content item that corresponds to the display of the content item at each of the plurality of client devices, the relationship based on the corresponding mobile device property data; and
modify a content selection policy associated with the content item based on the relationship between the content item and the rendering performance data to restrict the content item subsequent selection in response to requests for content.

12. The system of claim 11, wherein the processor readable instructions further comprise instructions arranged to control the computer system to modify the content item to generate a modified content item.

13. The system of claim 12, wherein the processor readable instructions further comprise instructions arranged to control the computer system to associate the modified content item with a mobile device property, and provide the content item to mobile devices based on properties associated with the mobile devices.

14. The system of claim 12, wherein the processor readable instructions further comprise instructions arranged to control the computer system to
modify the content item based on a second relationship between content item properties of the content item and the rendering performance data.

15. The system of claim 11, wherein the processor readable instructions further comprise instructions arranged to control the computer system to determine the relationship between the content item and the rendering performance data of each of the plurality of client devices comprises determining relationships between latency and content item properties.

16. The system of claim 11, wherein the processor readable instructions further comprise instructions arranged to control the computer system to determine the relationship between the content item and the rendering performance data of the each of the plurality of client devices using a regression model.

17. The system of claim 11, wherein the processor readable instructions further comprise instructions arranged to control the computer system to obtain the rendering performance data by:
transmitting the content item to a mobile device, the content item comprising content to be displayed at the client device and a script,
wherein the script is arranged to cause latency of the content item to be measured at a first time and at a second time and to transmit data the rendering performance data between the first and second time to the computer system.

18. The system of claim 17, wherein the processor readable instructions further comprise instructions arranged to control the computer system to embed the script in the content item.

19. The system of claim 11, wherein the one or more mobile device properties comprise a web page displayed with the content item, a data communication protocol, and a screen brightness.

* * * * *